Feb. 11, 1969  A. F. BOSCHI ET AL  3,426,937

IMPACT-RESISTING TANK

Filed June 1, 1967

Antonio F. Boschi
Aldo Valentinotti
INVENTORS

BY *Stevens, Davis, Miller & Mosher*
ATTORNEYS

United States Patent Office 3,426,937
Patented Feb. 11, 1969

3,426,937
IMPACT-RESISTING TANK
Antonio F. Boschi and Aldo Valentinotti, Milan, Italy, assignors to Pirelli S.p.A., Milan, Italy
Filed June 1, 1967, Ser. No. 642,868
U.S. Cl. 220—63                                    7 Claims
Int. Cl. B65d 25/18, 25/34, 25/42

ABSTRACT OF THE DISCLOSURE

An impact-resisting tank, comprising a non-airtight rigid casing containing a flexible liner provided with openings for the admission and the discharge of the fuel through the casing. The liner has walls sufficiently thick so as to prevent its collapse when empty, and is made of rubber, or similar material adapted to stretch to a high degree without breaking.

BACKGROUND OF THE INVENTION

Field of the invention

The present invention relates to a tank and, more particularly, to a fuel tank for vehicles, airplanes, or the like, which is able to withstand great impacts without allowing the escape of fuel contained therein.

Description of the prior art

It is very important to provide fuel tanks for airplanes, vehicles, and the like, which are capable of preventing escape of fuel upon great impacts occurring to the tank, especially in view of the danger of fire due to the presence of sparks caused by damaged electrical equipment near the tank.

For this purpose the use of semi-rigid plastic materials for these tanks has been proposed. However, the improvement obtained over conventional tanks, which are usually made of sheet metal, has proven very poor.

It also has been proposed to provide the conventional metallic tanks with an internal liner of a thin impermeable layer of thin rubberized fabric, or the like, which retained the liquid if the tank was cracked or broken for any reason. In order to eliminate abrasion, folds or cracks, the layer was secured at several points to the tank either by means of glue or adhesive agents, or by means of hooks or clips of various kinds. However, this arrangement also proved to be unsatisfactory since the deformation of the tank due to the impacts caused a tear of the impermeable layer secured to the tank, and a resultant fuel leakage.

SUMMARY OF THE INVENTION

It is therefore an object of the present invention to provide a tank which provides an improved container for liquids, such as fuel, which eliminates the above-mentioned disadvantages.

Briefly summarized, the tank of the present invention includes an airtight, flexible liner provided with the necessary openings for the entry and discharge of liquid and having walls sufficiently thick to prevent collapse when empty; and an outer rigid casing disposed in a loose fit around the liner, in a non-airtight fashion.

In a preferred embodiment of the invention, the casing consists of at least two parts connected together with clips of various types, or by means of welding spots spaced from one another in order to insure that the casing is not airtight. In this respect, it should be noted that the non-airtight rigid casing has a production cost lower than that of an analogous airtight casing, since some processing steps, such as brazing, can be eliminated.

In order to avoid an undesirable adhesion between the outer surface of the flexible liner and the inner surface of the outer casing, at least one of these surfaces is roughened so as to allow the presence of an air layer between the surfaces to prevent adhesion of said surfaces by a sucking action.

According to a further preferred embodiment of the invention, one or more of the openings in the liner for the admission and the discharge of the fuel, or for the passage of a level gauge, or the like, is provided with tubular ducts which pass through suitable holes formed in the rigid casing without being connected to the latter in any way. This makes the flexible liner quite independent of the rigid casing, with consequent advantageous safety features. For example, the possibility for the rigid casing, upon being deformed for any reason, to tear the flexible liner is reduced. This arrangement is also advantageous from an economical standpoint, due to the fact that it facilitates the connection of the tank to the body of the vehicle, or to other parts of it.

BRIEF DESCRIPTION OF THE DRAWINGS

Reference is now made to the accompanying drawings for a better understanding of the nature and objects of the present invention, which drawings illustrate the best mode presently contemplated for carrying out the objects of the invention and its principles, and are not to be construed as restrictions or limitations on its scope. In the drawings.

DESCRIPTION OF THE PREFERRED EMBODIMENT

Figure 1:
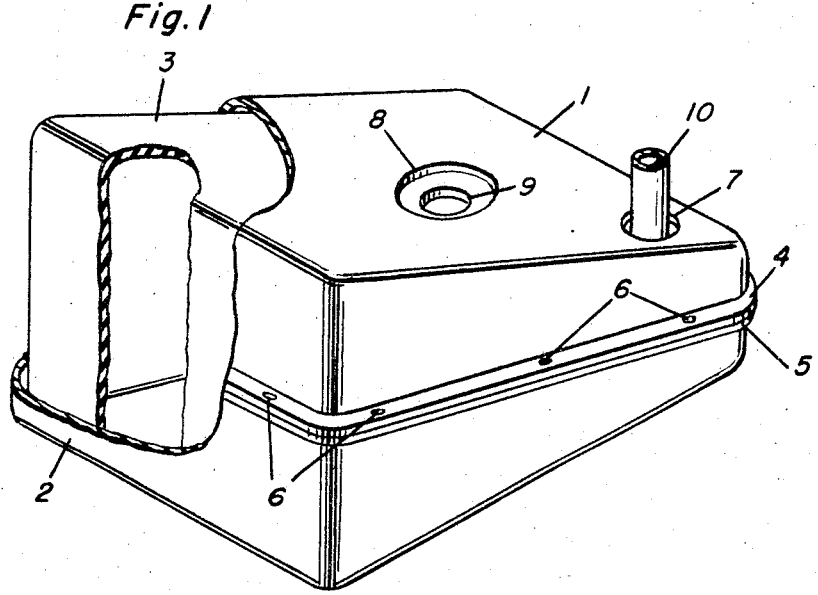
FIG. 1 is the perspective view of a tank according to the invention, some parts of which have been broken off to show the position of the tank elements.
Figure 2:
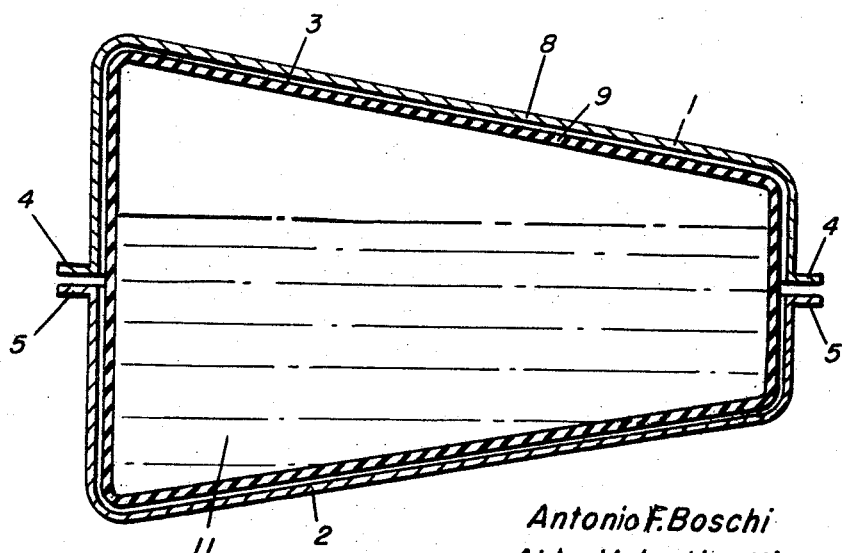
FIG. 2 represents the tank of FIG. 1, cut along a vertical plane passing through the opening for the passage of the level gauge and parallel to the greater side of the tank.

FIGS. 1 and 2 illustrate the tank of the present invention which comprises a rigid casing formed by an upper half 1 and a lower half 2, and containing a flexible liner 3 made of rubber and adapted to fit within the casing and contain the fuel 11.

The upper half 1 and the lower half 2 of the casing are respectively provided with flanges 4 and 5, facing each other. The two halves may be connected in any manner, such as by means of welding spots 6 spaced from one another along these flanges as shown, or by suitable clips or the like.

It should be emphasized that the casing should not be connected so as to be airtight. In fact, in case of deformation due to impacts, air must be allowed to penetrate between the casing and the liner in order that the latter may be completely free to move and to deform without adhering to the inner surface of the casing. This air penetration is further enhanced by making one of the adjacent surfaces of the casing and the liner rough, which results in an air layer being maintained between these surfaces.

The casing is provided with an opening 7 for the admission of the fuel, an opening 8 for the passage of a level gauge or the like, and with an opening, not visible in the figure, for the discharge of the fuel.

The liner 3 should preferably be made of a material able to stretch to a high degree without breaking, due to the fact that a large compression in the tank caused by an impact or the like can cause the flexible liner, on account of the inner pressure exerted by the contained liquid, to be forced through already existing openings or through cracks formed in the casing upon impact on the latter. In these situations the flexible liner must be able to extend out of the openings or cracks in the form of a bubble, without breaking. The most appropriate material for the liner is rubber, but it is understood that any other very extensible material may be used for this purpose.

It is also necessary for the flexible liner to have walls of a very large relative thickness so that it is self-supporting and to avoid the necessity of connecting it to the outer rigid casing.

As shown in FIGS. 1 and 2, the liner 3 is provided with an opening 9 for the level gauge, and a tubular duct 10 for the admission of the fuel, which passes through the opening 7 of the casing without being connected to the latter in any way. In FIG. 1 the duct 10 is simply represented as a tube section, but in practice it may be shaped to be directly connected to a stated point of the vehicle body, such as the outer filler. Of course, the liner 3 is provided with a discharge opening for the fuel, which is not shown in the drawings.

Of course, variations of the specific construction and arrangement of this type method and apparatus herein disclosed can be made by those skilled in the art without departing from the invention as defined in the appended claims.

We claim:
1. An impact-resisting tank for fluids, comprising a non-fluidtight outer casing of rigid material substantially totally surrounding an inner fluidtight liner of flexible resilient material, said liner being self-sustaining in a normal geometric configuration which conforms to the geometric configuration of the walls of said casing, the walls of said liner lying closely adjacent to the corresponding surrounding walls of said casing but being free relative thereto whereby the liner walls may shift relative to the adjacent casing walls, the liner walls being of elastomeric material such that said liner may be distorted relative to said normal configuration thereof and the liner walls may be elastically deformed pursuant to collapse of said casing and the consequent application of compressive forces upon parts of said liner.

2. The tank of claim 1, including conduit means connected to said liner and leading from interiorly of said liner to outwardly of said casing, opening means in said casing, said conduit means extending through said opening means freely relative to said casing.

3. A tank as in claim 1, wherein at least one of the adjacent walls of the liner and the casing is rough so as to allow the presence of an air layer between said walls.

4. A tank as in claim 1, wherein said outer rigid casing comprises at least two portions connected together in a non-airtight fashion.

5. A tank as in claim 4, wherein said portions are connected together by spot welding.

6. A tank as in claim 4, further comprising a plurality of clips adapted to connect said portions together.

7. A tank as in claim 1, wherein said liner is made of rubber.

References Cited

UNITED STATES PATENTS 3,330,439  7/1967  Moorman _____ 220—63 X

GEORGE T. HALL, *Primary Examiner.*

U.S. Cl. X.R.

150—.5; 220—5